Jan. 24, 1967   H. D. GORDON   3,300,042
RESILIENT UNITS
Filed July 30, 1964   5 Sheets-Sheet 1

INVENTOR
Henry D. Gordon
BY Frank H. Borden
ATTORNEY

INVENTOR.
Henry D. Gordon
BY
Frank H. Borden
ATTORNEY

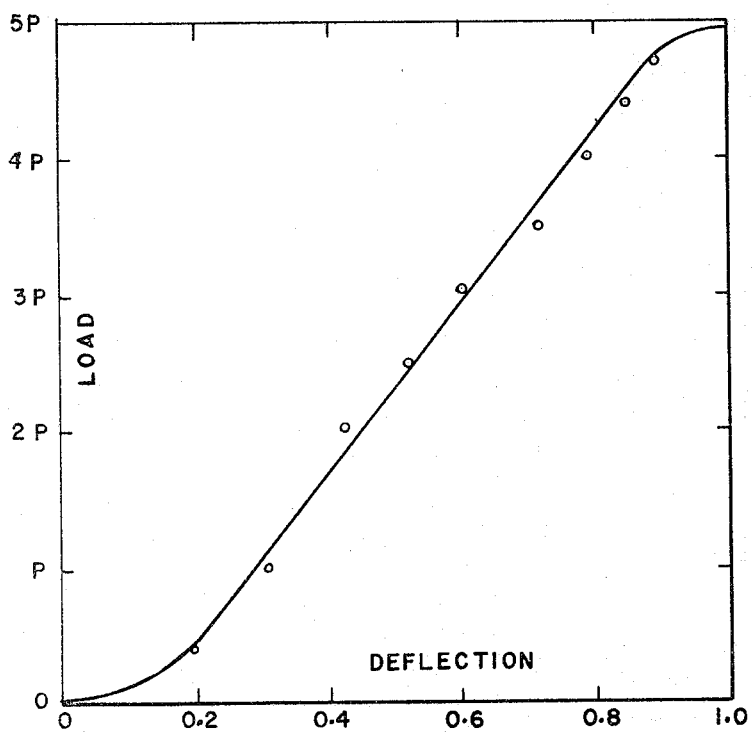
Fig. 9.
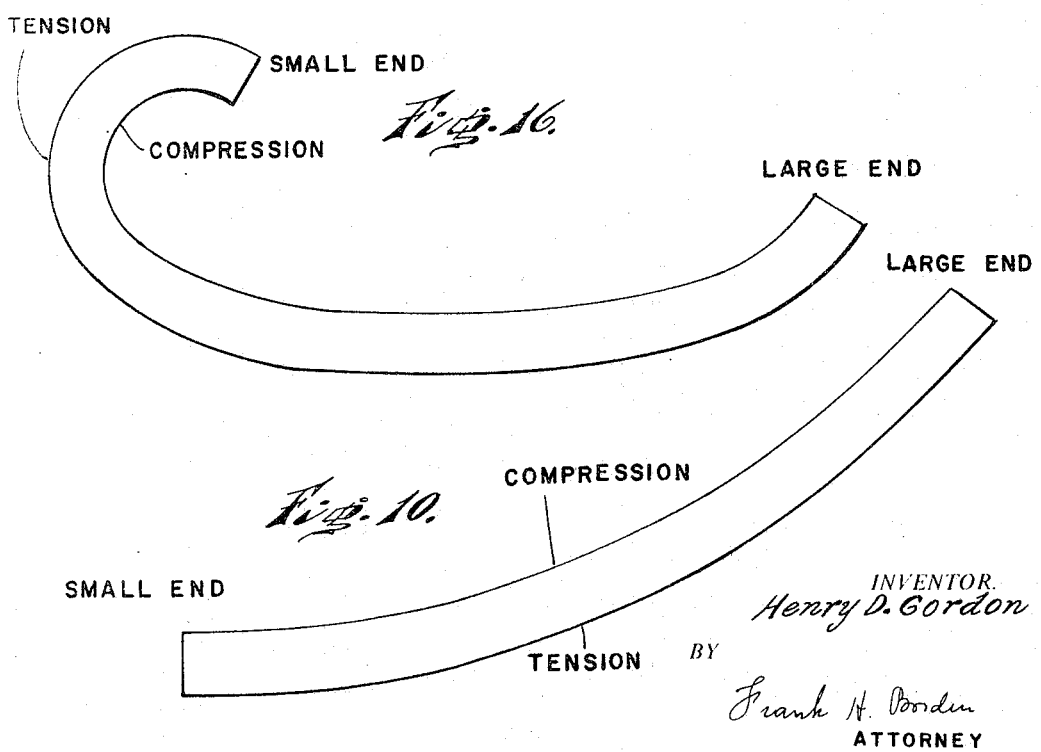
Fig. 16.
Fig. 10.
INVENTOR.
Henry D. Gordon
BY
Frank H. Borden
ATTORNEY

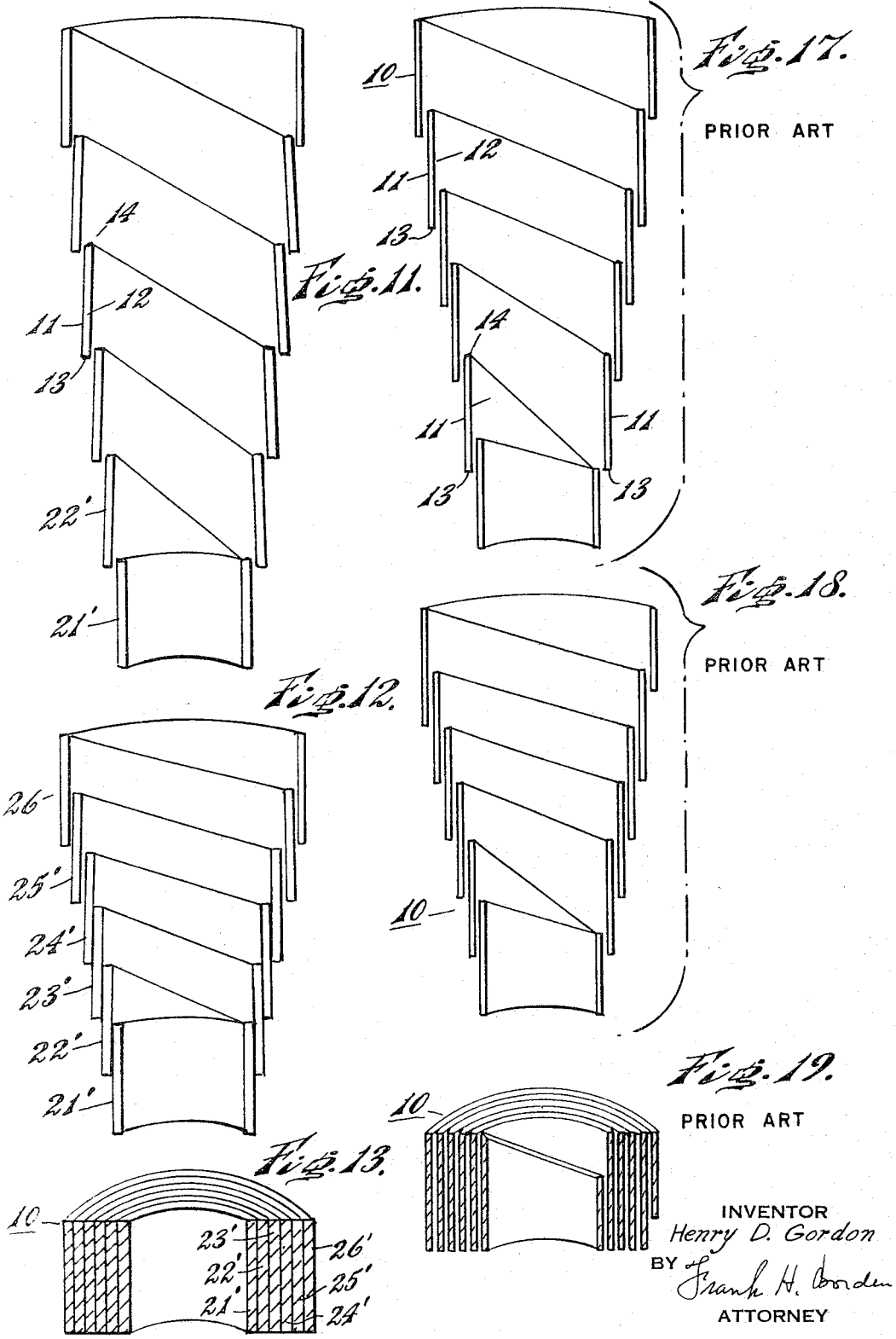

3,300,042
RESILIENT UNITS
Henry D. Gordon, 6601 Marsden St.,
Philadelphia, Pa. 19135
Filed July 30, 1964, Ser. No. 386,339
16 Claims. (Cl. 207—62)

This invention relates to compression or tension resilient units, of predeterminedly controlled force and deformation characteristics in loading and unloading.

There are many situations in which work is to be done by a unit, in which it is imperative that both the loading and unloading rates be sharply controlled, to identical or varying degrees to secure desired load and work effects. Thus, for purely illustrative instance, with some unit installations, with a given applied loading force storing energy therein, release of the compressive or loading force, and operation of the unit under its stored energy, finds the unit end moving beyond its initial position at which loading was first applied. This is possibly a form of inertia and may well be undesirable, especially when the unit is anchored at one end only. This phenomenon may be characterized as an explosive expansion, which should be curved. In some cases this type or phase of unit reaction causes drift of hydraulic or like equipment in overcoming inertia, resulting at least in undesirable hunting before stabilization is established. In other illustrative cases it is desired that the unit resistance and/or return rate be closely controlled as contrasted to the rate of application of the load, as in units having dash-pot functions. In other cases it is desired to provide a unit which can be stored in compressed form secured at one end, and when released forms a rigid tube having a free end, which is so rigid as to withstand appreciable lateral forces. So far as known there are no prior art devices by which these desirable control functions can be achieved.

It may be noted that the design and functions of the units of this invention in the several forms to be described are not necessarily explicable according to the text books and the authorities, and indeed at times may seem to be at wide variance therefrom. However, they are valid provable matters, as experiment has established.

So far as known there is no really relevant prior art to the instant invention. With conventional axial springs, whether formed of wire or resilient ribbons, per se, without adjuncts or compensating gear of some sort, when engaged at opposite ends by relatively moving components, the spring is compressed and collapsed or deformed under increasing loads incident to the movement of the components toward each other, storing most of the compressive force as potential energy. When permitted to expand, most of the potential energy is converted into dynamic energy moving the ends of the spring and the components against which they are engaged apart, thus doing work. Ignoring the small amount of energy which is converted into heat, application of compressive force to the spring finds each increment of compressive force attended or followed by an increment of collapse, attended or followed by the storage of an increment of potential energy in the spring. The increments of collapse usually become progressively smaller as the compressive force progressively increases. Conversely as the spring ends are permitted to move apart by reason of the conversion of the stored potential energy into dynamic energy, each increment of converted energy is accompanied by an increment of spring expansion. The increments of expansion usually become progressively larger as the dynamic force decreases. In all known forms of springs the graph of deformation under increasing loading force is substantially identical with the graph of expansion under decreasing dynamic force. This is true whether the springs are positive or negative in application. That is, instead of compressing the spring positively by moving the ends together, the springs may be extended negatively in tension by moving the ends apart to store the potential energy.

Moreover, conventional axial springs, when anchored at one end and compressed toward that end with maximum storage of potential energy, with the other end of the spring free and subject to release, finds said other end moving in expansion beyond its normal location in the uncompressed condition of the spring. This as mentioned is a so-called explosive expansion and is undesirable.

It is one of the objects of the invention to provide a self-contained resilient one-piece unit which is selectively uniformly linear, or of predeterminedly nonlinear, loading rate and collapses in predetermined order in response to continuously increased loading. In the uniform predetermined linear functioning of the unit it collapses in increments directly proportional to the increase of load. In the predetermined non-linear form of the unit, for example, the unit is compressible in increments in more or less wide divergence from the linear, and delivers force also in more or less wide divergence from the linear, whereby, purely for example the unit collapses initially slightly (through a narrow range), as a function of fairly large increments of increase of applied load, and then collapses for a secondary extent through a wide range as a function of relatively small increments of increased load, and finally collapses through a tertiary small range as a function of relatively large increments of applied load. As a corollary of these functions the unit obviously exerts an equal and opposite force through the same range of motion in expanding, although this is not an explosive expansion.

Another object of the invention is to provide a self-contained resilient one-piece unit which exerts resistance to collapse in ever increasing amplitude, while it exerts force in a decreasing manner. This is in the nature of a dash-pot in which the resistance to collapse requires higher force than is developed by the unit in expansion.

Still another object of the invention is to provide a self-contained resilient one-piece unit which is so formed that it absorbs force and motion and converts some of the energy into restrictive force and friction.

Another object of the invention is to provide a self-contained resilient one-piece unit having turns or courses which interact with each other as the unit is compressed or expanded to secure predetermined constrictive and frictional effects affecting the rate of compression and/or expansion of the unit.

Many other objects and advantages will become more apparent as the description proceeds.

As will be developed the instant invention distinguishes from all known quasi-relevant prior art, whether of wire or ribbons of resilient material. Most of the latter are purely spiral, with all turns lying generally in the same transverse plane, and in parallelism with each other and with the central axis. In those instances in which the ribbon of resilient material is helical, i.e. spiral with axial elongation, the turns or courses have respectively different radial spacing from but parallel to the axis and to each other. As a result the radial spacing between contiguous courses or turns is the same in the extended spring attitude as in the ultimate compressed retracted attitude, and the energy absorption rate is a direct function of the resilience of the respective turns or courses.

In contrast to the foregoing, according to the instant invention, the radial spacing between contiguous courses in the extended attitude is different from the radial spacing between contiguous courses in the compressed attitude. This is because of the predetermined interplay between contiguous courses in certain changes of attitude of the unit. Thus, in one form of unit according to the invention the radial spacing of contiguous turns in the extended attitude is minimal, absent, or negative, whereas in the compressed retracted attitudes the radial spacing may be appreciably greater. In another form the spacing in the extended attitude may be appreciable, whereas in the retracted compressed attitude the clearance may be minimal, absent, or negative. This is predeterminable and is established by the particular angular relation between contiguous courses and the respective angular relation of the courses or turns to the axis of generation of the generally conical hollow frustum of a cone with which the invention is primarily concerned.

In carrying out the invention in a preferred organization a ribbon of resilient material is formed into a hollow frustum of a cone, the end turns of which, usually, are formed into general cylinders forming bearing surfaces to receive loads and transmit forces, with adjacent turns between the generally cylindrical ends in predetermined relative angular relationships to effect the desired characteristics in loading, and/or in unloading. The predetermined angular relationship is with relation to the axis of the cone as well as to contiguous turns, and introduces certain frictional and constrictive effects which affect the collapse of the unit, as well as its work-producing expansion. This, in conjunction with the given degree of overlap of contiguous turns effects important changes in the unit's characteristics compared to anything done in the past.

It is to be noted that with a self-contained unit formed of a single ribbon of resilient material as described, the laws established for the construction and operation of wire or other types of springs have substantially no bearing.

In the accompanying drawings, forming part of this description:

FIG. 1 represents a schematic section through an illustrative form of nonlinearly responding unit, according to the invention, in its fully open expanded controlled rigidified attitude with substantially no radial freedom between turns or courses, and with the angularity between internal faces of turns increasing positively relative to the axis of the unit in progression from the small end of the unit, with the angularity of each successive turn increasing as a generally logarithmic function.

FIG. 9 represents an illustrative graph of load against deflection of the unit of FIG. 6, which in major part is essentially linear.

FIG. 10 represents schematically a plan of the unit of FIG. 6 after it has been forcibly unwound from its coiled form in FIG. 6, showing the ribbon as shaped into a relatively smooth arc, with substantially uniform tension and compression strains on opposite edges of the developed ribbon.

Figure 1:
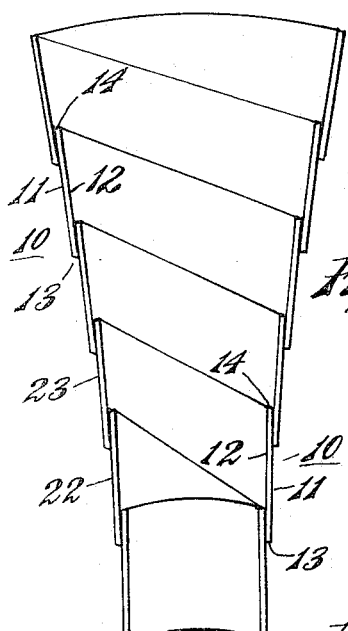
Figure 6:
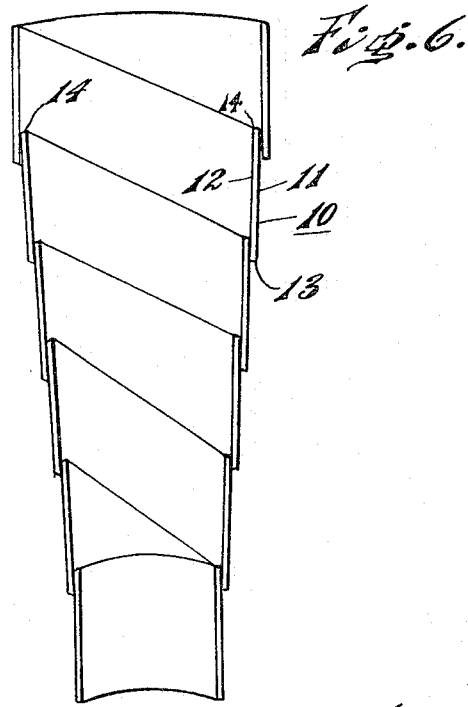
FIG. 6 represents a schematic section through an illustrative linearly responding unit, according to the invention, in its fully open expanded controlled attitude with substantially no radial freedom between courses or turns and with the angularity between internal faces of successive turns relative to the axis of the unit increasing from the smaller end as a generally arithmetical function.

FIG. 11 represents a schematic section through another illustrative form of the invention in its fully open or expanded condition, in which the cant or inclination of successive turns relative to the axis of the unit in progression from the smaller to the larger end is negative, as contrasted to the positive cant of the turns of FIGS. 1 and 6 with all turns having substantial radial freedom, which is eccentric in its response in the sense that the curve or graph of collapse and the rate of storage of potential energy under increasing load is different from the curve or graph of expansion under converted potential energy.

FIG. 12 represents a similar section of the unit of FIG. 11 in its partially open or partially closed condition, with partial radial freedom between turns or courses.

FIG. 13 represents a similar section through the unit of FIG. 11 in its fully compressed condition with all turns in parallel relation with no radial freedom between turns.

Figure 14:
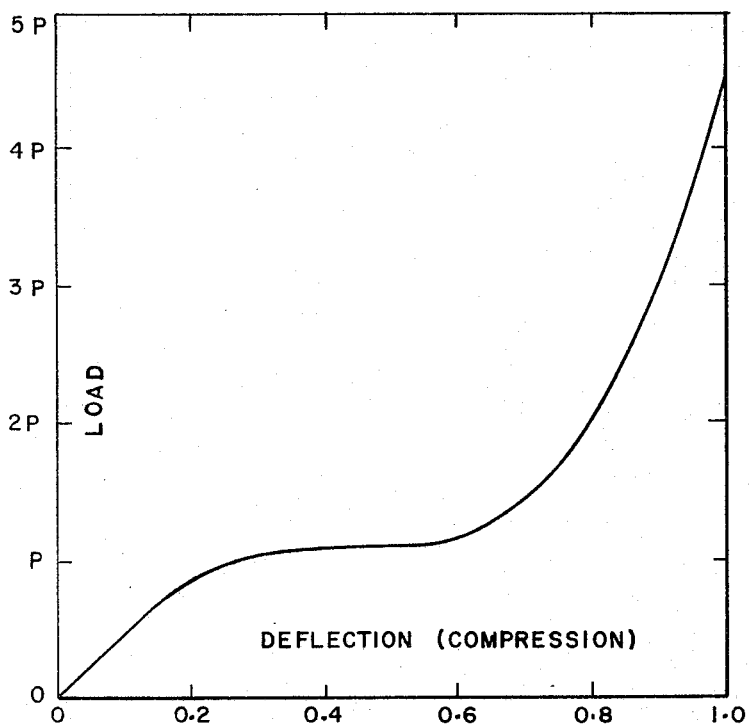

FIG. 14 represents a purely illustrative graph of load (absorption) against deflection (compression) of the unit of FIG. 11, showing that a minimal force is absorbed in the initial collapse with a progressively more rapid resistance for the remainder of the deflection or collapse.

Figure 15:
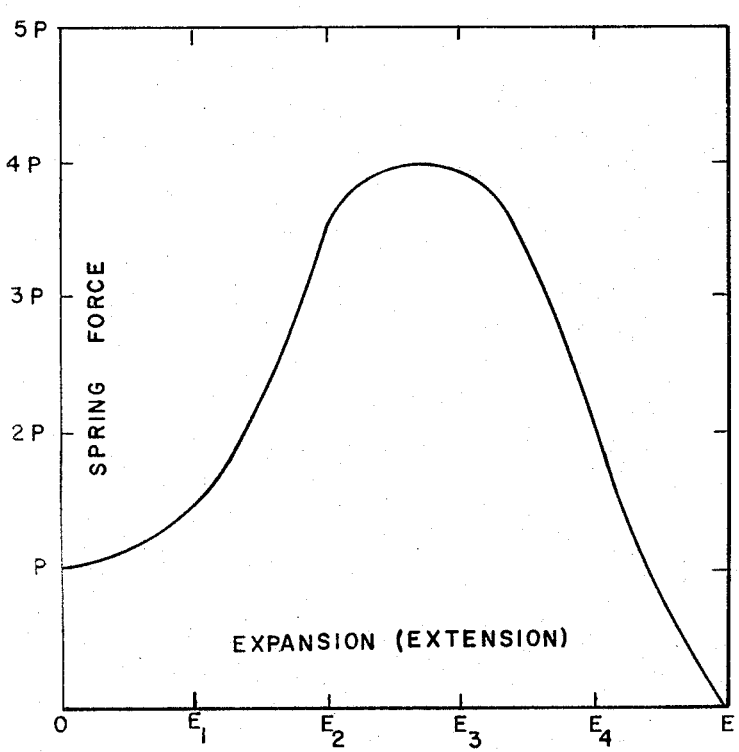

FIG. 15 represents a purely illustrative graph of force exertion of the unit of FIG. 11 against expansion (extension), showing a comparatively rapid release of force through the initial expansion, with a progressively lesser force through the remainder of its expansion.

Figure 5:
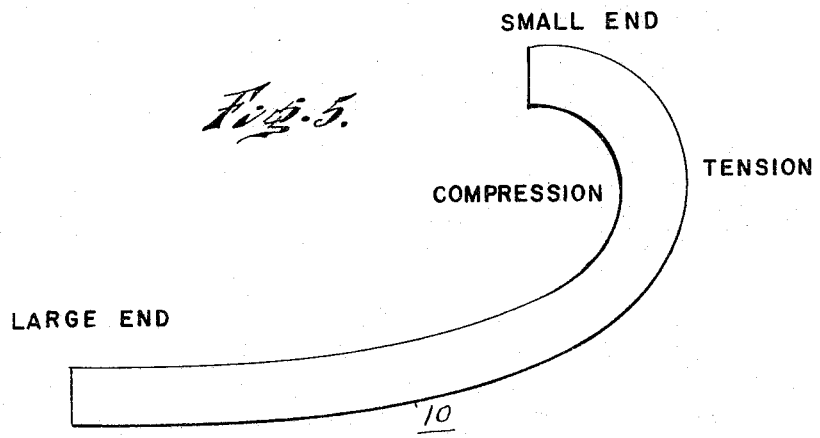
FIG. 5 represents schematically a plan of the ribbon of the unit of FIG. 1 after it has been forcibly unwound from the coiled form of FIG. 1, showing the peculiar progressive, irregular curvature attained by the ribbon in its shaping with progressively increasing tension and compression strains on opposite edges of the ribbon.

FIG. 16 represents schematically a plan of the developed unit of FIG. 11, after it has been forcibly unwound from its coiled form in said figure, showing the ribbon as shaped into an irregular curve, the substantial opposite or reverse of that of FIG. 5.

FIGS. 17, 18, and 19 represent schematic sections of an illustrative device of the prior art, respectively, of such device in its fully expanded attitude or position, its partially open or partially closed attitude, and its fully compressed condition or attitude, in all of which contiguous turns have complete radial freedom and are in mutual parallelism with each other and with the axis of the device.

Each unit, according to the invention, and for convenience, in the prior art, is formed of a ribbon of suitable resilient material, 10, having when wound or coiled, an outer face 11, an inner face 12, a lower edge 13 and an upper edge 14. The ribbon, as noted, may be formed of any suitable resilient material, including the so-called "plastics," but generally it is preferred to utilize steel, stainless steel, berylium copper, or the like, or some other form of metal or alloyed metal. The ribbon generally is a strip having greater width than thickness and of uniform cross-section.

It is established in the superficially most relevant of the known prior art, that a ribbon of suitable material may be wound into a helix forming a hollow frustum of a cone. However, this has been formed and operated as in FIGS. 17, 18 and 19, in which with plural turns, the angle between diametrically opposed faces of the turns in every stage is zero. In other words the respective diametrically oppositely facing internal faces 12 are parallel to each other and to the axis of generation or center line of the cone, and whatever radial spacing and freedom exists between the turns in the outermost or maximum extension of the device remains the same through partial compression and into full compression, as shown in FIG. 19. There is no significant contact of any predetermined sort between contiguous turns of the device, and it compresses and expands at the same uniform rates.

The instant invention is concerned with the angular relation of each turn to the axis as well as to contiguous turns, and to the radial spacing or lack of spacing effective in various attitudes or condition of the units.

In carrying out the invention in a general frustum of a hollow cone, it is preferred that the end turn of at least one end, and preferably at both ends be formed as general cylinders forming bearing surfaces or flat terminals, with axially overlapping turns extending between the cylinders together comprising the primary invention.

In general the invention in its several disclosed forms comprises a single-piece unit having a terminal turn formed into a cylinder from which the next succeeding turns verge radially and axially angularly merging incrementally into an additional angular tilt vergence relative to the axis of the cylinder so that these turns are stressed radially or circumferentially axially angularly and in tilt from the basic cylinder which is stressed circumferentially only.

Figure 2:
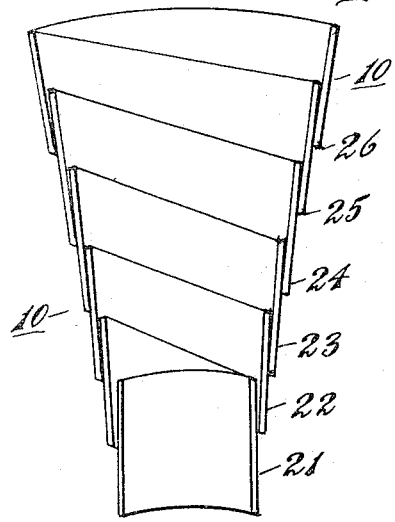
FIG. 2 represents a similar section through the unit of FIG. 1 in its partially opened or partially compressed attitude, in which the courses have partial radial freedom.
Figure 3:
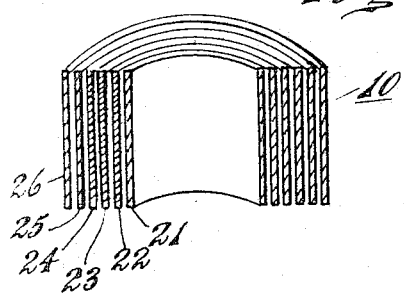
FIG. 3 represents a similar section through the unit of FIG. 1, in its fully compressed attitude, with all turns having complete radial freedom and being in substantially parallel mutual relation.

Referring to FIGS. 1, 2 and 3, and for exaggerated clarity, particularly to FIG. 2, the lowermost turn 21, is illustratively, generally cylindrical and has a substantially zero angle between the confronting diametrically opposing inner faces 12. This is, of course, also true of the respective outer faces 11. The next succeeding turn or course 22 has an angle between diametrically opposite inner faces 12 or relative to the axis of said cylinder which is greater than the zero angle of turn 21. While this angle between faces may be any which is predetermined for the end use of the unit, for purely illustrative instance it may be considered as 5°. Each succeeding turn, illustratively 23, 24, 25, and 26, has a tilt or cant angle between diametrically opposing inner faces 12, which is predeterminedly greater than that of the preceding turn. If the illustrative 5° increase of angle is used, purely for example, and not in limitation, the angle between internal faces of turn 23 will be 10°. That between internal faces of turn 24 will be 15°. That of turn 25 will be 20°, and that of end turn 26 will be 25°. The internal angles continue to increase for each increment of turn. Of course if the angle between one turn face and the axis of the unit is considered, it will be approximately one-half of the recited illustrative angle between the diametrically opposed inner faces of the turn. In this illustrative case (FIG. 1.), the larger end turn 26 is disclosed as canted and does not comprise a cylinder, although as noted, this form of terminal end turn may be utilized. Within the purview of the invention turn 26 may comprise the only cylinder of the unit.

It will be seen in this form of the invention that in the fully compressed condition shown in FIG. 3, the respective turns, illustratively 21 to 25 inclusive, are in free radial spacing and are in parallelism with each other and with the center line or axis. These turns (in FIG. 3) are possessed of stored potential energy because of prior compression, and in one exemplification the small end 21 may be anchored and the large end 26 may be free and, if desired may be temporarily held against expansion by any suitable triggering mechanism (not shown) for controlled release. Upon such release and expansion of the unit toward the condition indicated in FIG. 2 the respective angled turns begin to assume their preset angles and to exert lateral pressure at their lower internal edges against the outer faces of the next preceding lower turns. This effects frictional and constrictive interply between courses or turns, absorbing the dynamic energy. This reaches a climax in the condition of the unit shown in FIG. 1, in which by lateral friction and constriction of succeeding turns against preceding turns, the unit becomes a locked and rigidfied whole incapable of further expansion. Additionally the rigidified unit is resistant to lateral pressures, so that it can be anchored at the small end 21 and extended into transverse fluid flow with the larger end 26 a free end, when such use is desired.

Figure 4:
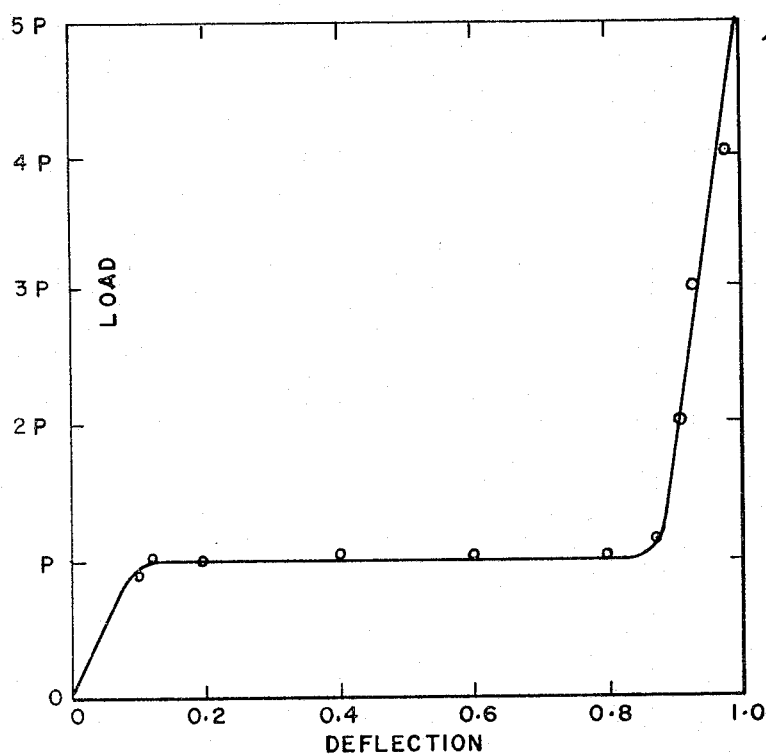
FIG. 4 represents a purely illustrative graph of load against deflection of the resilient unit of FIG. 1, showing the non-linear deflection, deformation, or collapse of the unit despite incremental load changes.

It will be seen, FIG. 4, that with the unit as shown in FIG. 1, it requires an appreciable compressive force to move the frictionally and constrictively engaged courses or turns toward the condition indicated in FIG. 2, but that at this point the compressive force necessary to collapse the spring becomes minor so that with slight increase of such force the unit compresses through a wide range. At the conclusion of this range of compression the force necessary to effect full compression may rise somewhat.

This unit has a wide range of nonlinear collapse or expansion as indicated in FIG. 4.

Figure 7:
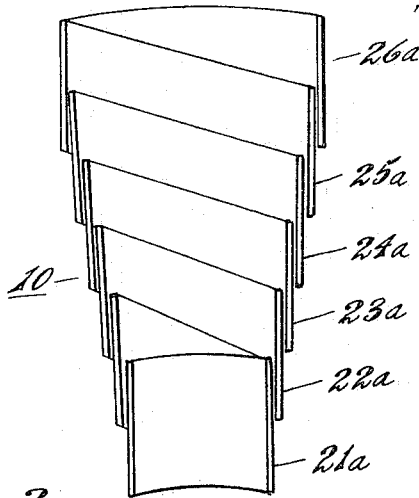
FIG. 7 represents a similar section through the unit of FIG. 6 in its partially open or partially compressed attitude, in which the courses have partial radial freedom.
Figure 8:
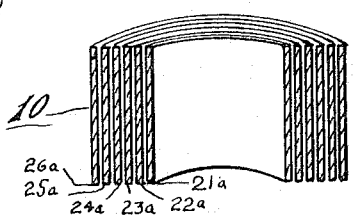
FIG. 8 represents a similar section through the unit of FIG. 6, in its fully compressed attitude with all turns having complete radial freedom and being in substantially parallel mutual relation.

Another form of the invention is disclosed in FIGS. 6, 7 and 8. In this version, as particularly shown in exaggerated form in FIG. 7, the lower small turn 21a, a cylinder, has effectively zero angle between the internal diametrically opposed faces of the turn. The next succeeding turn, 22a has an angle greater than zero between confronting internal diametrically spaced faces of a given angularity between each other or relative to the common axis. For purely illustrative instance let it be assumed that this angle is plus 5°. This angle exists on each of the succeeding turns 23a, 24a, and 25a relative to the common axis. Turn 26a, illustratively, returns to the cylindrical form.

Thus some point on each turn interesects a line angularly divergent from the vertical touching all of the turns. In contrast to this in the form of invention shown in FIG. 1, etc. some point on each turn is tangent to an irregular (French) curve. This is why the upper end of FIG. 1 is of much greater diameter than that of FIG. 6, although the diameter of the respective smaller ends may be similar.

It will be seen of FIG. 6, that in the fully expanded attitude or condition, each turn is contricted about the instant preceding turn and by friction and constriction locks the unit against further extension, and also rigidifies same.

The unit of FIG. 6 etc. requires appreciable compressive force to collapse the unit to a point at which the constrictive force between turns is relieved, and as shown in FIG. 9 thereafter the force application and the collapse are substantially linear until just before the unit closely approaches the condition or attitude shown in FIG. 8 at which the compressive force per increment of collapse may change somewhat from the linear.

Generally speaking the units of FIGS. 1 and 6 follow the same respective graphs of force and unit attitude both in collapse and expansion, (see FIGS. 4 and 9). However, as will be described, this is not essential and it is possible to fabricate a unit which has a different graph of collapse from the graph of its expansion, (see FIGS. 14 and 15), which, so far as known is unique in any phase of the known prior art.

In the form of invention shown in FIGS. 11 and 12, the lowermost turn 21', a cylinder, has an inside or internal angle between diametrically opposed walls of zero value. The turn 22' has negative internal angle (1), between diametrically opposed or confronting faces of smaller than the illustrative zero angle of turn 21'. Turn 23' has negative internal angle (2) less than angle (1). Turn 24' has negative internal angle (3) less than angle (2). Turn 25' has negative internal angle (4) less than angle (3). Finally turn 26', illustratively a cylinder, has an internal angle (5) which is the same as angle (1).

It will be seen that in the fully expanded form illustrated by FIG. 11, there is substantially free radial freedom between turns. This, therefore, requires relatively small force to initiate and progress collapse for a short interval at the beginning of the compression of the unit. As soon as this initial collapse has begun, however the sloping walls of upper turns constrict upon and about adjacent or contiguous lower turns, as shown in FIG. 12. This imposes both friction and constriction between contiguous turns, greatly increasing the resistance to collapse. Finally the turns will have been forced into parallelism and tight constrictive relation as shown in FIG. 13.

The collapse of the unit of FIG. 11 is illustrated by the graph of FIG. 14.

Upon expansion, however, a great deal of energy is required to move the turns from the attitude of FIG. 13, in their close binding constrictive relation toward the attitude of FIG. 12. Therefore, the expansion of the unit absorbs a large amount of energy on the first portion of the expansion, for a small expansion of the unit. After the turns are substantially in the relative positions indicated in FIG. 12, it requires relatively small energy to expand the then relatively free turns to their maximum attitude. The graph of the expansion of the unit is indicated in FIG. 16. It will, of course, be obvious that the graph of collapse is quite different from the graph of expansion of the unit of FIG. 11.

It will be observed that the unit of FIG. 1 has a positive change of angularity between contiguous turns, in an incrementing generally logarithmic series, whereas the unit of FIG. 6 has a positive change of angularity between contiguous turns in a generally arithmetic series. The unit of FIG. 11, on the other hand, provides a series of negatively canted or inturned turns.

It will be clear that for desired results the canting of turns may be partially positive and partially negative, and the angularity of each turn to the axis of the unit may be uniform or increasing or decreasing angularity. In other words, the illustrative angularity of turns in any form of the resilient unit may be positive or negative, and may be uniform, or may be arithmetically or logarithmically progressive.

Further, it will be understood that any given unit may may have turns of one type and other turns of a different type, for securing desired functional effects.

Having described my invention I wish it known that I claim the following:

1. A resilient unit comprising in its entirety a one-piece ribbon of resilient material coiled upon itself and forming a generally frusto-conical hollow body having an axis and formed of end turns connected by generally helical axially overlapping turns, one at least of said helical turns having an angle between diametrically opposite internal faces different from the angle between diametrically opposite internal faces of a contiguous turn, one of said end turns comprising a substantial cylinder.

2. A resilient unit comprising a ribbon of resilient material coiled upon itself and forming a generally frusto-conical hollow body having an axis and formed by end turns connected by generally helical axially overlapping turns, one at least of said helical turns having an angle between diametrically opposite internal faces different from the angle between diametrically opposite internal faces of a contiguous turn, in which said end turns are generally cylindrical.

3. A resilient unit comprising in its entirety a one-piece ribbon of resilient material coiled upon itself between a smaller and a larger end and forming a generally frusto-conical hollow body having an axis and formed by end turns connected by generally helical axially overlapping turns, the end turn of one end comprising a cylinder, one at least of said helical turns having an angle between diametrically opposite internal faces different from the the angle between diametrically opposite internal faces of a contiguous turn, in which the angle between diametrically opposite internal faces of said one turn is also different from the angles between diametrically opposite internal faces of the other contiguous turn.

4. A unit as in claim 3 in which the angle between diametrically opposite internal faces of said one turn is positive relative to said axis.

5. A unit as in claim 3 in which the angle between diametrically opposite internal faces of said one turn is negative relative to said axis.

6. A reslient unit comprising as a complete integral entity a ribbon of resilient material coiled upon itself and forming a generally frusto-conical hollow body having an axis and comprising end turns connected by generally helical axially overlapping turns, of progressively greater angularity relative to said axis, one of said end turns comprising a substantial cylinder.

7. A unit as in claim 6 in which the relative angularity of successive turns relative to said axis increases from one end as a generally logarithmic function, whereby the deformation under load is a non-linear function of the compressive force.

8. A unit as in claim 6 in which the relative angularity of successive turns relative to said axis increases from one end as a generally arithmetic function, whereby the deformation under load is a substantially linear function of the compressive force.

9. A resilient unit comprising in its entirety a ribbon of resilient material coiled upon itself and forming a generally frusto-conical hollow body having an axis and comprising end turns connected by generally helical axially overlapping turns, one of said end turns comprising a cylinder, said helical turns having internal face angles relative to the axis such that in full expansion each helical turn has a frictional constrictive engagement with a preceding turn as to rigidify the body and limit its expansion.

10. A unit as in claim 9 in which the radial freedom between contiguous helical turns in full expansion is non-existent, whereas in complete collapse it is appreciable.

11. A resilient unit comprising a unitary integral ribbon of resilient material coiled upon itself and forming a generally frusto-conical hollow body having an axis and comprising non-helical end turns connected by generally helical axially overlapping turns, said helical turns having negative face angles relative to the axis such that in full expansion each helical turn has radial freedom relative to contiguous turns whereas in complete collapse the radial freedom is nonexistent.

12. A resilient unit comprising a unitary integral ribbon of resilient material coiled upon itself and forming a generally frusto-conical hollow body having an axis and comprising non-helical end turns connected by generally helical axially overlapping turns, such helical turns having respectively internal faces in acute angular relation to the axis whereby a graph of collapse under compressive force is significantly different from the expansion graph under stored energy.

13. A resilient unit formed in its entirety of a single integral ribbon of resilient material wound in turns into a general frustum of a cone about an axis, at least one of said turns having an out of parallel angular relation to an adjacent turn in other than the collapsed condition of the unit.

14. A resilient unit formed in its entirety of a single integral ribbon of resilient material wound in turns into a general helix having an axis, a predetermined turn of said ribbon having an angular tilt out of parallelism with said axis and with a contiguous turn and establishing a frictional engagement with said contiguous turn under load which decreases as the load increaese.

15. A resilient unit formed in its entirety of a single continuous ribbon coiled upon itself and forming a general frustum of a hollow cone, comprising an end turn shaped as a cylinder from which emerges successive helical turns in overlapping relation.

16. A unit as in claim 15 in which certain of said helical turns are angularly displaced out of parallelism with the axis of the cylinder.

References Cited by the Examiner

UNITED STATES PATENTS

| 21,255 | 8/1858 | Harrison | 267—62 |
| 840,027 | 5/1906 | Stucki | 267—62 |

FOREIGN PATENTS

| 530,086 | 9/1956 | Canada. |
| 102,466 | 9/1925 | Germany. |
| 104,264 | 7/1899 | Germany. |
| 1,038,842 | 9/1958 | Germany. |
| 583,689 | 4/1960 | Great Britain. |

ARTHUR L. LA POINT, *Primary Examiner.*

R. FIELD, R. M. WOHLFARTH, *Assistant Examiners.*